United States Patent [19]

Uffindell

[11] 4,261,567
[45] Apr. 14, 1981

[54] HAND GRIP

[75] Inventor: Paul J. Uffindell, Morrow, Ohio

[73] Assignee: 'totes', Incorporated, Loveland, Ohio

[21] Appl. No.: 47,221

[22] Filed: Jun. 11, 1979

[51] Int. Cl.³ .............................................. A63B 53/14
[52] U.S. Cl. .................................... 273/81 R; 264/45.1
[58] Field of Search ............ 273/68, 72 R, 72 A, 273/73 J, 75, 81 R, 81 B, 81.4–81.6; 272/67, 68, 75; 74/551.9; 16/42 R; 145/61 R, 61 C, 61 E

[56] References Cited

U.S. PATENT DOCUMENTS

| | | | |
|---|---|---|---|
| 1,557,853 | 10/1925 | Lipscomb | 145/61 E |
| 2,644,978 | 7/1953 | Becker | 16/42 R |
| 2,704,668 | 3/1955 | Park | 273/81.4 X |
| 2,713,369 | 7/1955 | Strahm | 273/72 A X |
| 3,811,596 | 5/1974 | Wilson | 273/72 A X |

FOREIGN PATENT DOCUMENTS

| | | | |
|---|---|---|---|
| 1194124 | 6/1970 | United Kingdom | 273/81 R |
| 1356971 | 6/1974 | United Kingdom | 273/81 R |

*Primary Examiner*—Richard J. Apley
*Attorney, Agent, or Firm*—Wood, Herron & Evans

[57] ABSTRACT

A hand grip for a hand-held implement, e.g., a golf club, that consists of a rigid cap and a one-piece flexible foam tubular sleeve. The cap is structured to cooperate with the implement's handle shaft for locating and retaining the grip on that shaft, and for protecting the end of the shaft and the outer end of the foam sleeve. The one-piece flexible foam sleeve, preferably with an outer skin thereon to resist abrasion, provides a cushioned grip to the user. A novel method is also provided by which the rigid cap and foam sleeve grip are fabricated.

24 Claims, 6 Drawing Figures

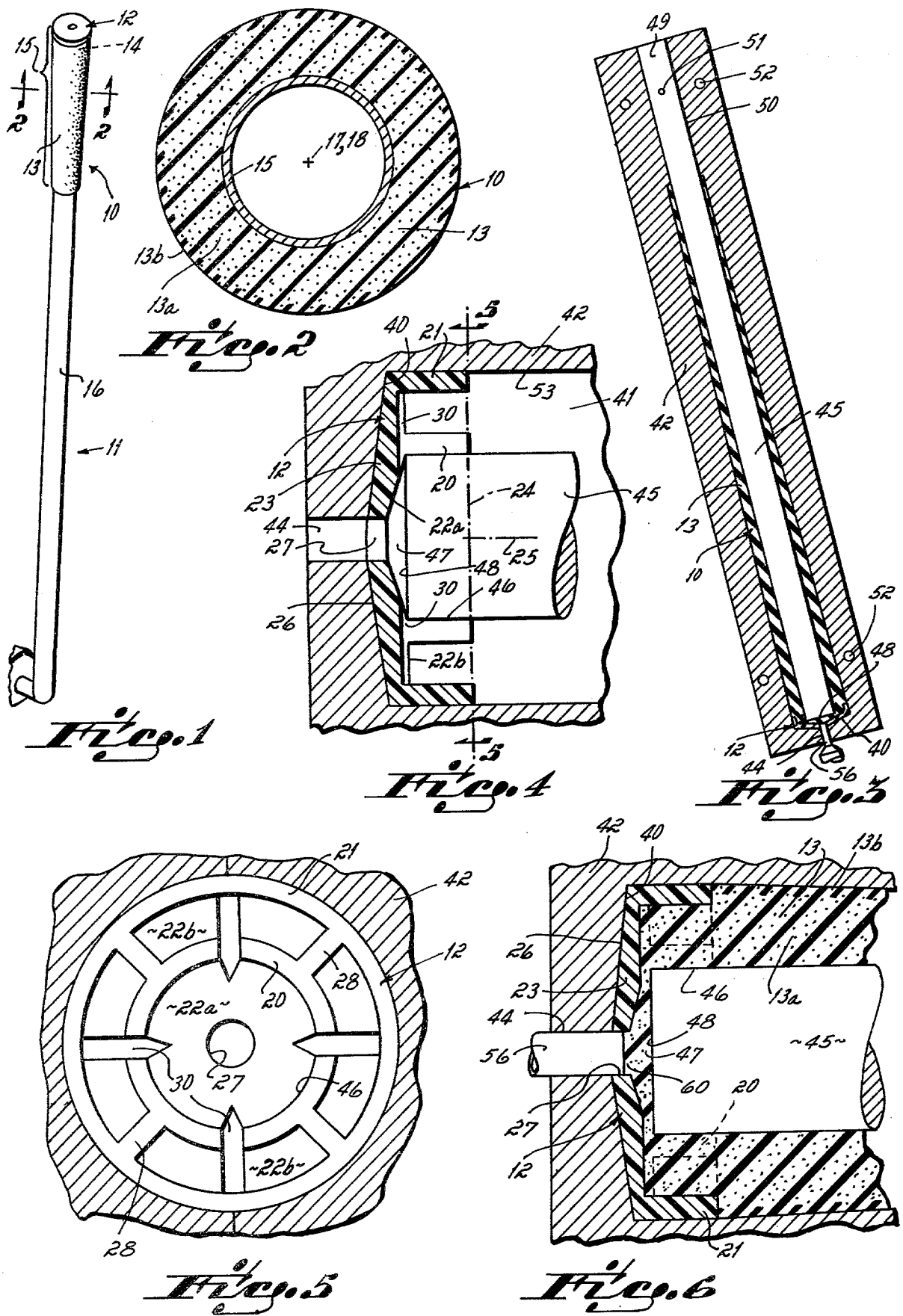

HAND GRIP

This invention relates to hand held implements. More particularly, this invention relates to a unique grip for hand held implements, and to a unique method for fabricating same.

Hand held implements, basically, fall into two classes. The first class includes those used for pleasure, and the second class includes those used for work. The first calss mainly includes sporting goods equipment such as golf clubs, baseball bats, tennis rackets, paddle tennis paddles, badminton rackets, hockey sticks, canoe paddles and the like. In the second class are small hand tools such as screw drivers, hammers, chisels, wrenches, pliers, and the like, and large hand tools such as rakes, hoes, pruning shears, shovels, wheelbarrow handles, and the like.

The common basic characteristic to each of these hand held implements, from the standpoint of this invention, is that the implement's handle must be generally linear (although not necessarily absolutely straight, as a slightly curved handle may be used) in configuration from one end to the other. That is, one end of the handle must be connected to the working head of the implement, but the other end must not be connected to that implement's working head. Such a handle is hereinafter referred to as a free-end handle. Each of the implement examples noted in the above paragraph, in the common form of each, possesses a free-end handle. An example of a handle on a hand-held implement which is connected at both ends to the implement's working head, i.e, which is not a free-end handle, is a hand held carpenter's saw of the cross-cut or rip type; the handle for this type of hand held carpenter's saw is in the form of a closed loop connected to the saw's blade. The grip of this invention is not adapted for use on such a carpenter's saw.

It has been one objective of this invention to provide a novel and unique hand grip for a hand held implement, the structural concept of the grip being adaptable for use in a wide variety of hand held implements, each having, as a basic common characteristic, a generally linear (although not necessarily absolutely straight) handle shaft connected at only one end to the implement's working head.

It has been another objective of this invention to provide a novel and unique hand held implement grip in which the grip's tubular sleeve consists of a flexible foamed plastic material with an outer skin formed from that same material and integral therewith, and the grip's cap is formed of a rigid non-flexible material, the cap cooperating with the implement's handle shaft to retain the outer end of the grip in fixed position with the handle shaft and to protect the outer end of the foamed sleeve, and the foamed sleeve providing a cushioned hand grip for the implement's user.

It has been another objective of this invention to provide a novel method for producing the novel hand grip, that novel method allowing a pre-formed cap to be connected in situ with a foamed flexible sleeve during the foaming of a plastic material in a reaction injection molding type process.

In accord with the objectives of this invention, the hand grip for a hand held implement, e.g., a golf club, consists of a rigid cap and a one-piece flexible foam tubular sleeve. The sleeve cap is structured to cooperate with the implement's handle shaft for locating and retaining the grip on that shaft, and for protecting the end of the shaft and the outer end of the foam sleeve. The one-piece flexible foam sleeve preferably with an outer skin thereon to resist abrasion, provides a cushioned grip to the user. A novel method is also provided by which the rigid cap and foam sleeve grip are fabricated.

Other objectives and advantages of the hand grip and method of this invention will be more particularly apparent from the following detailed description taken in conjunction with the drawings in which:

FIG. 1 illustrates a golf club with a grip structured and formed in accord with the principles of this invention;

FIG. 2 is a cross-sectional view taken along line 2—2 of FIG. 1;

FIG. 3 is a cross-sectional view of a split mold illustrating the grip fabrication method in accord with the principles of this invention;

FIG. 4 is an enlarged cross-sectional view of the preformed cap in assembled relation with the split mold and mold mandrell prior to introduction of the thermoplastic foam to form the sleeve;

FIG. 5 is a cross-sectional view taken along line 5—5 of FIG. 4 but with the mold mandrel removed; and FIG. 6 is a view similar to FIG. 4 but after introduction and set up of the plastic foam reactants to form the sleeve.

A hand grip for a hand held implement, in accord with the principles of this invention, is shown in the form of a hand grip 10 for a golf club 11. The grip 10 is basically comprised of a rigid cap 12 and an integral, one-piece flexible foam sleeve 13. The cap 12 is adapted to be seated on the free end 14 handle shaft section 15 of the linear club shaft 16, and the flexible foam sleeve 13 defines the hand grip area of the grip 10 for the user's hands. The axis 17 of the grip 10 is linear, is disposed coaxially with the linear axis 18 of the handle shaft portion 15 of the golf club 11, and is symmetrical in cross-section relative to those axes 17, 18.

The grip's tubular sleeve 13, as shown particularly in FIG. 2, is comprised of a closed cell plastic foam 13a interiorly of an outside surface skin 13b. Preferably the closed cell foam 13a interior and exterior skin 13b of the grip are integral one with the other, and formed simultaneously during manufacture, to form thereby an integral one-piece sleeve for the grip that incorporates no further wrapping or other type elements on the outer surface thereof. The skin 13b, which is essentially non-cellular, is preferably of a thickness between about 0.005 inches and about 0.020 inches for a golf club grip 10. The closed cell foam portion of the grip is preferably of a hardness between about 55° Shore A and about 65° Shore A as measured by ASTM Test No. D 2240-75, thereby providing a relatively flexible tubular sleeve 13 when the grip 10 is not mounted on the handle shaft section 15 of the golf club 11. This hardness range, and flexibility established thereby, permits the cellular sleeve 13 to provide a cushioned effect to a user's hands when the golf club is gripped during use, but prevents significant abrasion or erosion of the cellular sleeve 13 upon repeated use since the sleeve is covered by the integral tough skin 13b. It is further preferred that the foam sleeve 13 have a tear resistance between about 125 pounds per linear inch (pli) and 300 pli as measured by ASTM Test No. D624-73, and a modulus at 100% elongation of between about 500 psi and 1000 psi as measured by ASTM Test No. D412-75. It is most preferred that the flexible cellular sleeve 13 be fabricated of a polyurethane.

The golf grip's cap 12, prior to interconnection with the foam flexible sleeve 13, is shown in cross-section in FIG. 4, and is shown from an inside end view in FIG. 5, even though the cap is in assembled relation with a forming mold in both those figures. The cap 12 is fabricated of a rigid plastic material, the rigidity of the cap being relative to the flexibility of the foam plastic sleeve 13. The cap 12 is provided with inner 20 and outer 21 concentric flanges which extend inwardly from and are molded integral with the inner surface 22 of the cap's end wall 23, the inner and outer flanges terminating in a phantom plane 24 transverse to the cap's symmetry axis 25. The outer surface 26 of the cap's end wall is of a convex configuration, and that outer end wall is provided with a small diameter entry port 27 (relative to the large diameter of the circular cap) coaxially aligned with the cap's longitudinal axis 25. As shown in FIG. 5, and interiorly of the cap 12 between the inner 20 and outer 21 flanges, spaced support ribs 28 are molded integral with the one-piece cap to maintain the annular concentricity of the annular flanges 20, 21. The four support ribs 28 shown are spaced at 90° relative one to the other, and extend from the outer end plane 24 of the flanges 20, 21 to the inner surface 22 of the cap's end wall 23. The support ribs 28 provide greater rigidity to the inner flange 20 and, therefore, to the cap 12 itself, when the cap is assemlbed with the handle shaft section 15 of the golf club 11 explained in greater detail below. The inside surface or floor 22 of the cap, as shown in FIG. 4, is of a concave configuration concentrically positioned relative to the cap bore 27 and, therefore, relative to the cap's axis 25. Note particularly, as shown in FIGS. 4 and 5, that four spaced distribution channels 30, located equi-distant one from another and symmetrically positioned relative to the cap's support ribs, connect the domed area 22a of the cap's inside face with the annular quadrant spaces 22b defined between the inner 20 and outer 21 flanges and ribs 28. These distribution channels 30 are of particular benefit in the manufacture of the grip as explained in greater detail below. However, these distribution channels 30 also permit the foam plastic sleeve 13 material to extend not only into the annular quadrants 22b defined by the inner 20 and outer 21 flanges and ribs 28, but also into the domed center section area 22a of the cap's inside face, thereby providing a mechanical lock type interconnection through the distribution channels 30 which tends to aid in retaining the sleeve 13 in fixed connection with the cap 12 after installation on the golf club's handle shaft section 15.

It is preferred that the rigid or non-foam cap 12 have a hardness between about 70° Shore A and about 90° Shore A as measured by ASTM Test No. D2240-75, a tensile strength at break between about 5000 psi and about 7000 psi as measured by ASTM Test No. D412-75, and a percentage elongation at break between about 400% and about 500% as measured by ASTM Test No. D412-75.

The method of fabricating the hand grip and, particularly, the golf club grip 12, in accord with the principles of this invention is illustrated in FIGS. 3, 4 and 6. As shown in those figures, and particularly FIG. 4, the pre-formed cap 12 is initially seated at one end 40 of a molding cavity 41 in one-half 42 of a split mold, the outside surfaces of outer flanges 21, and the outer surface 26 of the cap's end wall 23, being sized and configured to fit flush against the ends 40 of the cavity 41 in both mold halves 42 when both halves of the mold are assembled. The mold 42 is provided with an inlet port 44 oriented coaxial with the bore 27 in the cap's end wall 23 when the cap is properly seated in the mold. Further, and after the cap 12 is oriented in the mold 42, a mandrel 45 having an outside diameter slightly less than the outside diameter of the handle shaft portion 15 of the golf club 11 is seated or received in the seat 46 defined by the cap's inner annular flange 20 and the domed portion 22a on the inside face 22 of the cap's end walls 23. In this seated relation of the mandrel 45 with the cap interiorly split mold 42, note that the cap's distribution channels 30 are not sealed or closed off because the mandrel is seated against the inner surface of the cap's end wall 23 at a position where it cannot seal off the distribution channels. This structural relation of the mandrel 45 with the cap 12 during the forming step provides an interior distribution chamber 47 partially defined by end face 48 of the mandrel and partially defined by conical inner surface 22a of the cap's end wall 23, all as shown in FIG. 4. The mandrel 45, at the other end 49, is seated in groove 50 set in the mold 42. The mandrel 45 is provided with a locator pin 51 at one end which is received in a locator bore (not shown) in the mating mold half (not shown) so as to retain the mandrel and the cap in assembled relation in the mold cavity 41 defined when the two mold halves 42 are assembled. The two mold halves 42 are retained in alignment in the assembled relation by locator pins 52 on one mold half 42 that cooperate with locator bores (not shown) on the mating mold half (not shown). When so assembled, therefor, the mold's interior surface 53, the cap 12 and the mandrel 45 define an annular or tubular sleeve shaped cavity 41 configuration.

Subsequently, and as shown in FIGS. 3 and 6, a discharge nozzle 56 is connected with the mold's inlet bore 44 and partially inserted into the cap's bore 27. The discharge nozzle 56 is connected with a metering device (not shown) for discharging a pre-determined quantity of reactants, preferably in liquid form, into the mold cavity 41. When these liquid reactants are injected into the mold cavity 41, they preliminarily enter the distribution chamber 47 defined between the cap's inner wall 22 and the mandrel's end surface 48, and are distributed through distribution channels 30 into the annular sleeve cavity 41. When in the mold cavity 41, the liquid reactants foam to provide the flexible foam sleeve 13 configuration as shown in FIGS. 3 and 6. This is generally known as reaction injection molding since the liquid reactants fully react only after injection into the mold cavity 41. With this liquid injection system where the reactants are injected into the split mold 42 in liquid form, the weight of the overall grip 10 is easy to control within a desired limited tolerance range. As mentioned, preferably the foam plastic is a polyurethane, and in this connection the polyol and isocyanate reactants are admixed upstream of the discharge nozzle 56 prior to the injection into the mold cavity. For a golf club grip 10 the liquid polyol preferably is a polyether type polyol and preferably the isocyanate is diphenyl methane diisocyanate. The polyol has a blowing agent preferably incorporated with it prior to being admixed with the isocyanate. This blowing agent is preferably trichloromonofluoroethane.

The thickness of the sleeve's skin 13b, i.e., of the essentially non-cellular part of the flexible sleeve 13, is determined by controlling the temperature of the split mold at the mold cavity's surface 53. In this regard, and as the polyurethane reaction is an exothermic reaction interiorly of the mold, by keeping the mold surface relatively cool regular sized cells are prevented from forming at the mold cavity surface 53, thereby establishing the skin shown. The thickness of the skin 13b on the flexible sleeve also may be varied by the type of blowing agent employed and the initial temperature of the reactants.

When the reactants are injected into the mold 42, preferably the mold is oriented between vertical and 60° to the horizontal with the pre-formed cap 12 being positioned at the base or bottom of the mold. Of course, the mold cavity 53 and mandrel 45 are preferably coated with a mold release agent prior to injection of the liquid reactants so as to permit easy removal of the foamed sleeve 13 grip formed therein.

A typical polyurethane system that may be used in fabricating the cap and sleeve is as follows:

Cap 12 thermoplastic polyether based polymethane manufactured by Mobay Chemical Co. and known as Texin 985A.

Sleeve 13 polyol is CHEMPOL 30, product no. 1977, manufactured by Freeman Chemical Co. isocyanate is CHEMPOL 30, product no. 201b, manufactured by Freeman Chemical Co. other constituents, ultraviolet stabilizer known as Tinovin P, manufactured by Ciba-Geiger Corp.

The cap 12 is formed by injection molding pellets of the cap urethane at 360° F.–410° F. The sleeve 13 is formed by injecting the reactants in separate streams at 72° F.–120° F. into the split mold which is at 90° F.–120° F.

After the urethane foam reaction process has been completed, note particularly that the bore 27 coaxially disposed in the grip's cap 12 is sealed against entry of foreign particles or moisture or the like because of distribution chamber 47 being filled with the foamed polyurethane, see FIG. 6. This is quite desirable in that once the end 14 of the handle shaft section 15 of the golf club 11 is seated within the inner annular flange 20, and since metal golf club shafts 16 are normally hollow with no closure at the upper end thereof, the seal 60 over of bore 27 prevents rain or dirt and the like from migrating inwardly through the cap's bore into the interior of the club's shaft. Moisture is undesirable in the interior of the club's shaft because of rust or corrosion that results, and dirt or small pebbles are undesirable interiorly of the shaft because of the rattling noise created during use. Further, and with this use of a pre-formed cap 12 during fabrication of the flexible cellular sleeve 13, the cap may be made of a contrasting color to the sleeve since it is a separate part.

In assembly of the grip 10 with the handle shaft section 15 of the golf club 11, the interior of the sleeve 13 is first washed with a solvent. In the case of a polyurethane, the solvent may be a chlorinated hydrocarbon such as perchloroethylene. After the interior surface area of the sleeve 13 has been washed, the grip is simply linearly and coaxially pushed onto the club's handle section 15 with the air trapped between the end of the handle shaft section 15 and the grip's cap 12, escaping to atmosphere between the grip's inner surface and the handle shaft section's outer surface since the cap's bore 27 is sealed off by distribution chamber seal 60, thereby acting as an air lubricant to help or aid in forcing the grip 10 onto the shaft 15.

Having described in detail the preferred embodiment of my invention, what I desire to claim and protect by Letters Patent is:

1. A golf club comprising
   a handle shaft section integral with the shaft of said golf club, and
   a hand grip mounted on said handle shaft section, said grip comprising
      a rigid cap adapted to be received in seated relation against the free end of said handle shaft section, said cap comprising an end wall, an annular outer flange and an annular inner flange, said annular flanges extending from the same side of said cap's end wall, said inner flange receiving said handle shaft section in supportive relation for preventing transverse movement of said cap relative to the longitudinal axis of said shaft section, and said cap comprising spaced support ribs molded integral with said cap between the inner and outer flanges thereof to maintain the annular concentricity of said flanges, and
      a flexible foamed tubular sleeve of plastic material connected at one end with said cap between said cap's inner and outer flanges, said sleeves surrounding said handle shaft section, said sleeve presenting a cushioned gripping surface area to a user's hands directly on the exterior surface of said foam sleeve, and said cap functioning to protect the outer end of sleeve against wear.

2. A golf club as set forth in claim 1, said hand grip further comprising
   an essentially non-cellular skin integral with said foamed tubular sleeve on the exterior surface of said foamed sleeve.

3. A gold club as set forth in claim 2, said cap and said foamed sleeve being fabricated of a polyurethane.

4. A golf club as set forth in claim 1, said cap further comprising
   a bore defined in the end wall of said cap, and
   at least one distribution channel formed in the inner annular flange to interconnect the seat area defined by said inner annular flange and said cap's end wall and the annular area defined between said inner and outer annular flanges and said cap's end wall, said distribution channel and said port being sealed by said foamed plastic material.

5. A golf club as set forth in claim 1, said cap having a hardness of between about 70° Shore A and about 90° Shore A, and said sleeve having a hardness of between about 55° Shore A and about 65° Shore A.

6. A golf club as set forth in claim 5, said cap having a tensile strength at break between about 5000 psi and about 7000 psi, and said sleeve having a tear resistance between about 125 pli and about 300 pli, and a modulus at 100% elongation between about 500 psi and about 1000 psi.

7. A hand grip for a hand-held implement, said implement including a handle shaft section adapted to receive said grip thereon, said grip comprising
   a rigid cap adapted to be received in seated relation against the free end of said handle shaft section, said cap comprising an end wall, an annular outer flange and an annular inner flange, said annular flanges extending from the same side of said cap's end wall, said inner flange being sized to receive said handle shaft section in supportive relation for preventing transverse movement of said cap relative to the longitudinal axis of said shaft section, and said cap also comprising spaced support ribs molded integral with said cap between the inner and outer flanges thereof to maintain the annular concentricity of said flanges, and a flexible foamed tubular sleeve connected at one end with said cap, said sleeve being adapted to surround the handle shaft section of said implement, said sleeve presenting a cushion gripping surface area to a user's hands directly on the exterior surface of said foam sleeve, and said cap functioning to protect the outer end of said sleeve against wear.

8. A hand grip as set forth in claim 7, said hand grip further comprising an essentially non-cellular skin integral with said foamed tubular sleeve on the exterior surface of said foamed sleeve.

9. A hand grip as set forth in claim 8, said cap and said foamed sleeve being fabricated of a polyurethane.

10. A hand grip as set forth in claim 7, said cap further comprising a bore defined in the end wall of said cap, and at least one distribution channel formed in the inner annular flange to interconnect the seat area defined by said inner annular flange and said cap's end wall and the annular area defined between said inner and outer annular flanges and said cap's end wall, said distribution channel and said port being sealed by said foamed plastic material.

11. A hand grip as set forth in claim 7, said cap having a hardness of between about 70° Shore A and about 90° Shore A, and said sleeve having a hardness of between about 55° Shore A and about 65° Shore A.

12. A hand grip as set forth in claim 11, said cap having a tensile strength at break between about 5000 psi and about 7000 psi, and said sleeve having a tear resistance between about 125 pli and about 300 pli and a modulus at 100% elongation between about 500 psi and about 1000 psi.

13. A golf club comprising a handle shaft section integral with the shaft of said golf club, and a hand grip mounted on said handle shaft section, said grip comprising a rigid cap adapted to be received in seated relation against the free end of said handle shaft section, said cap having an end wall, an annular outer flange and an annular inner flange, said annular flanges extending from the same side of said cap's end wall, said inner flange receiving said handle shaft section in suportive relation for preventing transverse movement of said cap relative to the longitudinal axis of said shaft second, a flexible foamed tubular sleeve of plastic material connected at one end with said cap, said sleeve surrounding said handle shaft section, said sleeve presenting a cushioned gripping surface area to a user's hands directly on the exterior surface of said foam sleeve, and said cap functioning to protect the outer end of said sleeve against wear, a bore defined in the end wall of said cap, and at least one distribution channel formed in said inner annular flange to interconnect the seat area defined by said inner annular flange and said cap's end wall and the annular area defined between said inner and outer annular flanges and aid cap's end wall, said distribution channel and said port being sealed by said foamed plastic material.

14. A golf club as set forth in claim 13, said hand grip further comprising an essentially non-cellular skin integral with said foamed tubular sleeve on the exterior surface of said foamed sleeve.

15. A golf club as set forth in claim 13, said cap having a hardness of between about 70° Shore A and about 90° Shore A, and said sleeve having a hardness of between about 55° Shore A and about 65° Shore A.

16. A golf club as set forth in claim 15, said cap having a tensile strength at break between about 5000 psi and about 7000 psi, and said sleeve having a tear resistance between about 125 pli and about A300 pli, and a modulus at 100% elongation between about 500 psi and about 1000 psi.

17. A golf club as set forth in claim 16, said cap and said foamed sleeve being fabricated of a polyurethane.

18. A golf club as set forth in claim 18, said cap comprising spaced support ribs molded integral with said cap between the inner and outer flanges thereof to maintain the annular concentricity of said flanges.

19. A hand grip for a hand-held implement, said implement including a handle shaft section adapted to receive said grip thereon, said grip comprising a rigid cap having an end wall, an annular outer flange and an annular inner flange, said annular flanges extending from the same side of said cap's end wall, said inner flange being sized to receive said handle shaft section in supportive relation for preventing transverse movement of said cap relative to the longitudinal axis of said shaft section when said grip is assembled with said shaft section, a foamed tubular sleeve connected with said cap between said cap's inner and outer flanges, said sleeve being receivable in seated relation on said handle shaft section, and said sleeve being flexible and resilient to provide a cushioned gripping surface for a user's hands, a bore provided through the end wall of said cap, and at least one distribution channel formed in the inner annular flange to interconnect the seat area defined by said inner annular flange and said cap's end wall and the annular area defined by said inner annular flange and said cap's end wall and the annular area defined between said inner and outer annular flanges and said cap's end wall, said distribution channel and said port being sealed by said foamed plastic material.

20. A hand grip as set forth in claim 19, said grip further comprising an essentially non-cellular skin integral with said foamed tubular sleeve on the exterior surface of said foamed sleeve.

21. A hand grip as set forth in claim 19, said cap having a hardness of between about 70° Shore A and about 90° Shore A, and said sleeve having a hardness of between about 55° Shore A and about 65° Shore A.

22. A hand grip as set forth in claim 21, said cap having a tensile strength at break between about 5000 psi and about 7000 psi, and said sleeve having a tear resistance between about 125 pli and about 300 pli and a modulus at 100% elongation between about 500 psi and about 1000 psi.

23. A hand grip as set forth in claim 22, said cap and said foamed sleeve being fabricated of a polyurethane.

24. A hand grip as set forth in claim 19, said cap further comprising spaced support ribs molded integral with said cap between the inner and outer flanges thereof to maintain the annular concentricity of said flanges.

* * * * *

UNITED STATES PATENT AND TRADEMARK OFFICE
CERTIFICATE OF CORRECTION

PATENT NO. : 4,261,567
DATED : April 14, 1981
INVENTOR(S) : Paul J. Uffindell

It is certified that error appears in the above—identified patent and that said Letters Patent is hereby corrected as shown below:

In column 7, line 64, change "aid" to --said--.

In column 8, line 16, change the second occurrence of "18" to --13--.

Signed and Sealed this

Twenty-fourth Day of August 1982

[SEAL]

Attest:

Attesting Officer

GERALD J. MOSSINGHOFF

Commissioner of Patents and Trademarks